United States Patent
Huang

(10) Patent No.: US 8,872,944 B2
(45) Date of Patent: Oct. 28, 2014

(54) METHOD AND SYSTEM FOR IMAGE CENTERING DURING ZOOMING

(75) Inventor: Chien-Min Huang, Clovis, CA (US)

(73) Assignee: Pelco, Inc., Clovis, CA (US)

(*) Notice: Subject to any disclaimer, the term of this patent is extended or adjusted under 35 U.S.C. 154(b) by 351 days.

(21) Appl. No.: 13/330,511

(22) Filed: Dec. 19, 2011

(65) Prior Publication Data

US 2013/0155290 A1 Jun. 20, 2013

(51) Int. Cl.
*H04N 5/262* (2006.01)

(52) U.S. Cl.
USPC ........................................ 348/240.1

(58) Field of Classification Search
CPC .................... H04N 5/23296; H04N 5/2628
USPC ........................................ 348/240.1
See application file for complete search history.

(56) References Cited

U.S. PATENT DOCUMENTS

| | | | |
|---|---|---|---|
| 7,729,602 B2* | 6/2010 | Janson et al. | 396/85 |
| 8,170,277 B2* | 5/2012 | Michimoto et al. | 382/103 |
| 2001/0046309 A1* | 11/2001 | Kamei | 382/103 |
| 2003/0103648 A1* | 6/2003 | Ito et al. | 382/103 |
| 2010/0157107 A1* | 6/2010 | Iijima et al. | 348/240.99 |

FOREIGN PATENT DOCUMENTS

JP 2001 243476 9/2001

OTHER PUBLICATIONS

Notification of Transmittal of the International Search Report and the Written Opinion of the International Searching Authority, or the Declaration; International Application No. PCT/US2012/070389; Date of Mailing: Mar. 22, 2013.

* cited by examiner

*Primary Examiner* — James Hannett
(74) *Attorney, Agent, or Firm* — Hamilton Brook Smith & Reynold, PC

(57) ABSTRACT

The methods and systems described herein are directed to image processing. More specifically, the image processing described herein may include centering an object in the field of view during zooming. The image processing methods and systems may further include setting a magnification factor, positioning the camera in a first field of view, capturing a first image, setting a second magnification factor, and capturing a second image. Additionally, the described techniques may include altering the first image to determine an offset and adjusting the camera based on the offset.

20 Claims, 10 Drawing Sheets

METHOD AND SYSTEM FOR IMAGE CENTERING DURING ZOOMING

BACKGROUND

This disclosure relates to video cameras in general and, in particular, to video cameras having optical zoom capability.

In cameras that have optics that provide variable zoom capability, it is generally found that when a camera is zoomed in on a target object that has been centered in the center of the frame, the target object is off-center from the original center. The more the camera is zoomed in, the more the object is off-center. In handheld cameras the effect is less noticeable since the user manually corrects to keep the desired center of the image centered in the viewfinder of the camera. However, it is annoying at the very least and may be challenging for the user to adjust the camera such that the object can be centered when the camera is zoomed in.

In addition, many camera applications or systems do not have a user to assist in this corrective repositioning. This can be a very serious problem for an automatic camera tracking system using a PTZ (pan, tilt and zoom) camera, such as in surveillance systems. Maintaining the object of interest in the field of view of the camera during zooming can be critical in such systems.

Accordingly, there has been a long felt need for a method and system to keep the object of interest centered when the camera is optically zoomed in on the object of interest.

SUMMARY

An example of a method of centering an object in the field of view of a camera during zooming includes the steps of setting a camera zoom to a first magnification factor so that the camera has a first field of view, positioning the camera so that an object is in a first position in the first field of view, capturing a first image with the camera at the first magnification factor, setting the camera zoom to a second magnification factor so that the camera has a second field of view with the second magnification factor being greater than the first magnification factor, capturing a second image with the camera at the second magnification factor, digitally altering a portion of the first image to create a third image that has a magnification factor equivalent to the second magnification factor, comparing the third image with the second image to determine the offset of the object from the first position of the object to the position of the object in the third image, and adjusting the camera based on the offset determined in the comparing step when the camera is zoomed.

Implementations of such a method may include one or more of the following features. Positioning the camera so that an object is in a first position in the first field of view includes positioning the camera so that the object is centered in the first field of view. The method further includes capturing a fourth image with the camera at a third magnification factor, digitally altering a portion of the first image to create a fifth image that has a magnification factor equivalent to the third magnification factor, comparing the fifth image with the fourth image to determine the offset of object from the first position of the object to the position of the object in the fourth image, and adjusting the camera based on the offsets determined in the comparing steps. The adjusting step includes interpolating the offset based on the magnification factor and the offsets determined in the comparing steps. The comparing step includes choosing a block from the third image containing at least a portion of the object and comparing it to blocks from the second image to determine a block that has a minimal block distance. The adjusting step includes adjusting the position of the camera. The adjusting step includes adjusting the position of the image sensor of the camera.

An example of a system for centering an object in the field of view of a camera includes a camera having a lens with a variable zoom, a lens controller connected to the lens to vary the zoom of the lens, an image sensor, the lens being positioned to provide light rays to the image sensor, an input for receiving an instruction to change the zoom of the lens, and a position controller for moving the camera, and further includes a processor in communication with the camera to provide signals to the camera and to receive images captured by the camera, the processor being adapted to provide a signal to the lens controller to set the lens zoom to a first magnification factor so that the lens has a first field of view, to provide a signal to the position controller to position the camera so that an object is in a first position in the first field of view, to provide a signal to the camera to capture a first image with the camera at the first magnification factor, to provide a signal to set the camera zoom to a second magnification factor so that the camera has a second field of view with the second magnification factor being greater than the first magnification factor, to provide a signal to the camera to capture a second image with the camera at the second magnification factor, to receive the first image from the camera and to digitally alter a portion of the first image to create a third image that has a magnification factor equivalent to the second magnification factor, to receive the second image and to compare the third image with the second image to determine the offset of the object from the first position of the object to the position of the object in the third image, and to provide a signal to the position controller to adjust the camera based on the offset when the camera is zoomed.

Implementations of such a system may include one or more of the following features. The processor is adapted to generate a signal to the position controller to position the camera so that the object is centered in the first field of view. The processor is adapted to generate a signal to the camera to capture a fourth image at a third magnification factor, to digitally alter a portion of the first image to create a fifth image that has a magnification factor equivalent to the third magnification factor, to receive the fourth image and to compare the fifth image with the fourth image to determine the offset of the object from the first position of the object to the position of the object in the fourth image, and to provide a signal to the position controller to adjust the camera based on the offsets determined. The processor is adapted to provide a signal to the position control to adjust the camera position based on interpolating the offset based on the magnification factor and the offsets determined.

An example of a non-transitory computer readable medium includes instructions configured to cause a processor to set a camera zoom to a first magnification factor so that the camera has a first field of view, position the camera so that an object is in a first position in the first field of view, capture a first image with the camera at the first magnification factor, set the camera zoom to a second magnification factor so that the camera has a second field of view with the second magnification factor being greater than the first magnification factor, capture a second image with the camera at the second magnification factor, digitally alter a portion of the first image to create a third image that has a magnification factor equivalent to the second magnification factor, compare the third image with the second image to determine the offset of the object from the first position of the object to the position of the object in the third image, and adjust the camera based on the offset determined when the camera is zoomed.

Implementations of such a non-transitory computer readable medium may include one or more of the following features. The instruction to position the camera so that an object is in a first position in the first field of view includes instructions configured to cause the processor to position the camera so that the object is centered in the first field of view. The non-transitory computer readable medium further include instructions configured to cause the processor to capture a fourth image with the camera at a third magnification factor, digitally alter a portion of the first image to create a fifth image that has a magnification factor equivalent to the third magnification factor, compare the fifth image with the fourth image to determine the offset of object from the first position of the object to the position of the object in the fourth image, and adjust the camera based on the determined offsets. The instructions to adjust include instructions configured to cause the processor to interpolate the offset based on the magnification factor and the offsets determined in the comparison. The instructions to compare include instructions configured to cause the processor to choose a block from the third image containing at least a portion of the object and compare it to blocks from the second image to determine a block that has a minimal block distance. The instructions to adjust include instructions configured to cause the processor to adjust the position of the camera.

The processes and systems described herein, and the attendant advantages, applications, and features thereof, will be more fully understood by a review of the following detailed description, figures, and claims.

DETAILED DESCRIPTION

Figure 1:
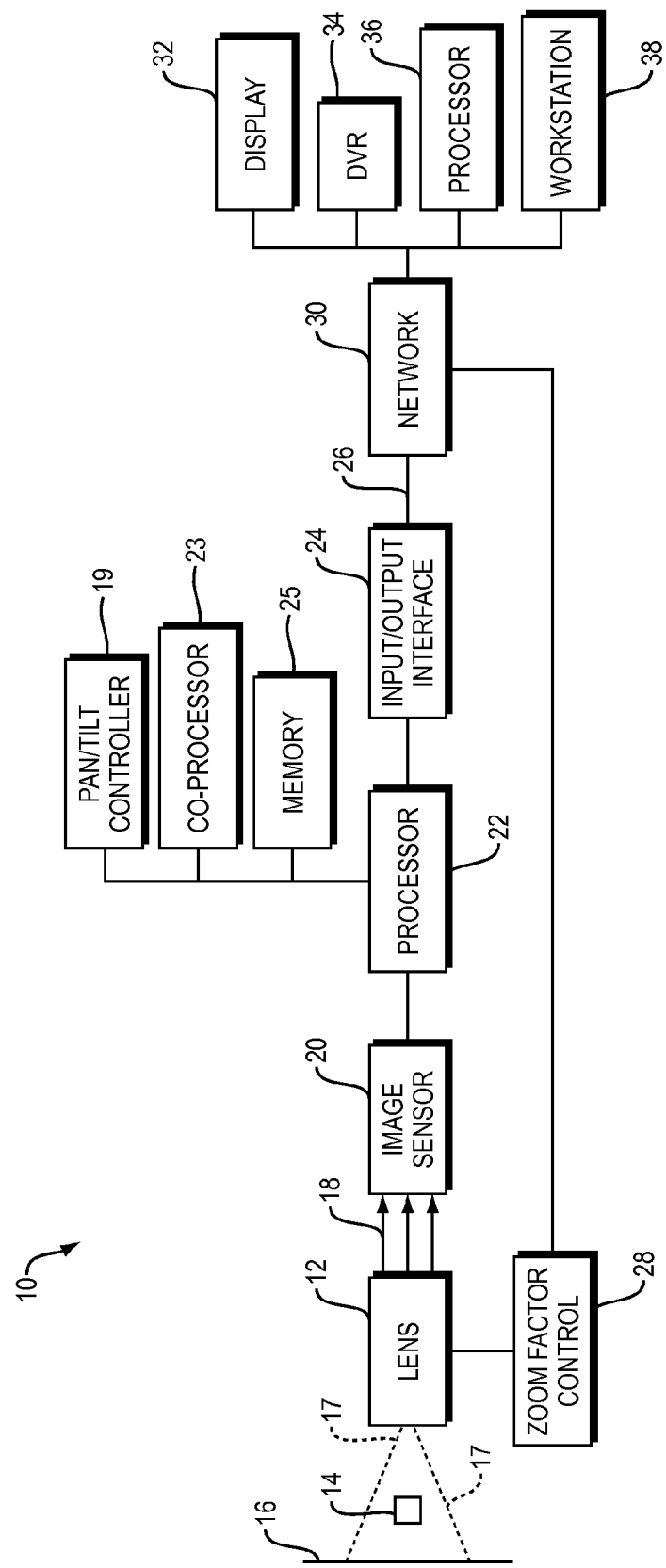
FIG. 1 is a block diagram of one embodiment of a camera in which various aspects of adjusting for shifts in the image center caused by zooming can be implemented.

FIG. 1 shows in block diagram form an exemplary camera that can be used with embodiments of the methods described herein. Camera 10 has a lens 12 with a field of view to capture an object of interest 14 and background 16. Lens 12 is an optically variable zoom lens with various levels of magnification thereby allowing camera 10 to zoom in or out on an object of interest 14. Lens 12 provides light rays, which are indicated by arrows 18 to image sensor 20. Image sensor 20 can be, for example, a charge coupled device (CCD). Light rays 18 landing on image sensor 20 cause image sensor 20 to provide signals to processor 22, which in turn is connected to input/output interface 24 to provide an output signal 26, such as an image frame of the scene captured by lens 12 in its field of view indicated by lines 17. The axis positions of image sensor 20 and lens 12 are fixed. Image data transferred through lens 12 to image sensor 20 illuminate image sensor 20 and create an image. Processor 22 is connected to memory 25 for storing algorithms and processes. Processor 22 is also connected to pan/tilt controller 19 which moves camera in the horizontal and vertical axes, in response to controls received from input/output interface 24, as well as in implementing various embodiments of the zoom centering methods describe herein.

Output signal 26 can be connected to a network 30 that in turn can be connected, for example, to a display 32, digital video recorder (DVR) 34 or processor 36. Network 30 can be a closed network, local area network, or wide area network, such as the Internet. Output signal 26 can be, for example, displayed on display 32, recorded in digital video recorder 34, or processed in processor 36. Zoom factor control 28 which controls the optical zoom or magnification factor of lens 12 may be a manual input or an automated input, such as a motor driven PTZ camera responding to control signals from an operator or program from workstation 38 connected to network 30.

Assuming that camera 10 is fixed, the actual scene image cannot change in relation to the camera optical axis, zooming in or out only changes the size portion, i.e., field of view, of the scene being viewed. If the center point of image sensor 20 is not aligned with the optical center of lens 12, object of interest 14 will shift position in the image captured by camera 10 as lens 12 is zoomed. As camera 10 is zoomed in, any alignment difference between the image axis and optical axis is magnified, causing the center point of the image to shift. This shift of the center point of the image also occurs as lens 12 is zoomed out although it is less troublesome since the size of object of interest 14 in the image becomes smaller. The image input will always have this problem. Even in tightly controlled quality cameras, it is virtually impossible to perfectly align the optical axis and the image sensor axis.

By using the methods and systems described herein, the image output can be corrected to remain centered. This can be accomplished in different embodiments by, for example, adding the methods and algorithms to the existing processing capability already in the camera, that is, processor 22, or by adding processing power, such as co-processor 23 to the camera, or by adding subsequent processing external to the camera but prior to the recording or display of the captured image. For example, the subsequent processing could be done in processor 36 connected to network 30 or in DVR 34 before the video is recorded.

Figure 2:
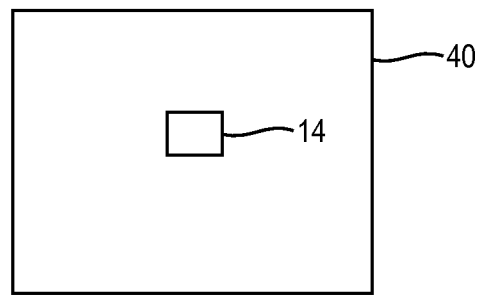
FIG. 2 is an exemplary frame captured by a camera at a first zoom factor.
Figure 3:
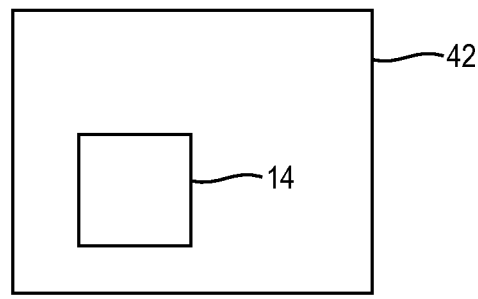
FIG. 3 is an exemplary frame captured by a camera at a second zoom factor.

FIGS. 2 and 3, which provide exemplary outputs 26 illustrated as frames 40 and 42 respectively, illustrate how object of interest 14 becomes off-centered when camera 10 is zoomed in. In FIG. 2 it can be seen that object of interest 14 is centered in frame 40 at a first level of zoom or magnification. FIG. 3 illustrates how object of interest 14 becomes off-centered in frame 42 at a second level of zoom, which is higher than the first level of zoom.

Figure 4:
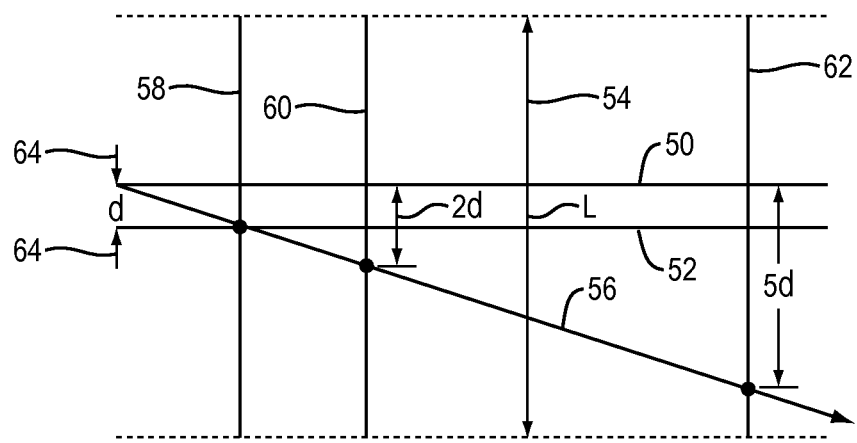
FIG. 4 is an exemplary diagram illustrating object projection on an image sensor at various zoom factors.

Referring to FIG. 4, an analysis of the problem presented by FIGS. 2 and 3 is illustrated with the same object projected on the different positions of the image sensor when the camera is set at different magnification factors. Line 50 illustrates the optical axis or optical center of, for example, lens 12. Line 52 illustrates the image center of; for example, image sensor 20. Line 54 indicates the size, shown as "L" of the image sensor. Line 56 illustrates the projection of an object of interest onto the image sensor. Line 58 illustrates the image plane at a magnification factor of one. Line 60 illustrates the image plane at a magnification factor of two. Line 62 illustrates the image plane at a magnification factor of five. FIG. 4 illustrates that the image center is not aligned with the optical center. Rather, the image center 52 is displaced from optical axis 50 by distance "d" which is illustrated by arrows 64. The intersection point of the optical center and the image plane is stationary in the image plane no matter what the magnification is.

FIG. 4 illustrates a case where the target object is located at point P, some distance away, along line 56. At magnification of one, the target object is at image center; at magnification of two, the target object is a distance d from image center, and at magnification of five, the target object is a distance 4d from image center. From this example, it can be seen that the larger the magnification, the farther off-center the object will be.

Figure 5:
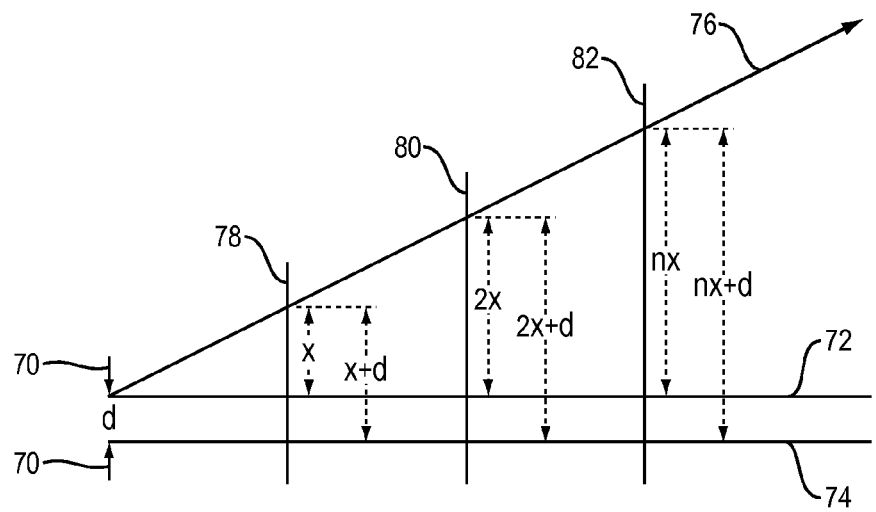
FIG. 5 is an exemplary diagram illustrating one embodiment of a method for determining the offset of an object of interest.

Referring to FIG. 5, one-dimensional data is used to illustrate an example of one embodiment of a method for determining the offset. In this example, the optical center 72 and image center 74 are offset by a distance d indicated by arrows 70. Line 76 illustrates the projection of a target object of interest onto the image sensor at point "P". Line 78 illustrates the image plane at a magnification factor of one. Line 80 illustrates the image plane at a magnification factor of two. Line 82 illustrates the image plane at a magnification factor of "n". At a magnification of one, the distance from P to the optical center is x, and the distance from P to the image center is x+d. At a magnification of two, the distance from P to the optical center will be 2x, and the distance from P to the image center will be 2x+d. Similarly, at a magnification of n, point P to the optical center will be nx and to the image center will be nx+d. From this analysis it can be seen that the point is always off by d.

Suppose that there are pictures or frames at magnification factors of 1, 2, . . . n. The picture or frame at magnification=1 is digitally enlarged, that is doubled by interpolation. The distance from P to the optical center for this interpolated image will be 2(x+d). Suppose that the interpolation is performed based on the image center. The interpolated image and the original image will have an offset, which is as follows:

Offset=(2x+d)−2(x+d)=−d.

Therefore, d can be found by aligning these two images. The image at an optical magnification factor of two is aligned with the digitally enlarged image that has been enlarged to a magnification factor of two to determine the offset.

Similarly, the same alignment process can be performed for different magnification factors. For magnification of n, the offset is as follows:

Offset=(nx+d)−n(x+d)=−(n−1)d.

The more the image is enlarged, the more detailed picture information is lost. This will affect the accuracy of the alignment. Another embodiment of a method is to align each pair of the images as follows: magnification at k and 2k, for k=1 to half of maximum magnification.

Offset=(2kx+d)−2(kx+d)=−d.

For a two-dimensional image, the offset will be ($d_x$, $d_y$).

Let p(x,y) and q(x,y) be two blocks, the block distance can be defined using the sum of the absolute difference as:

$$d = \sum_{x=1}^{u} \sum_{y=1}^{v} |p(x, y) - q(x, y)|^n$$

In general, the sum of absolute differences measures the similarity between the blocks by taking the absolute difference between each pixel in the original or reference block and the corresponding pixel in the block being used for comparison. The differences are summed to create a metric of block similarity.

One embodiment of a method for centering the object of interest when the zoom is modified is as follows. Center the camera on a stationary object or location that has a unique non-uniform texture. The texture should be non-uniform because if the texture is uniform, the alignment analysis of the images can become extremely difficult. Preferably the lighting and scene will not change during the processing period.

Figure 6:
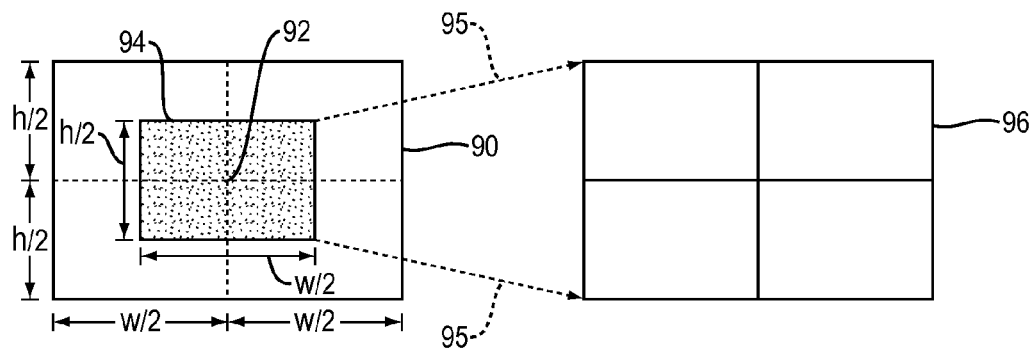
FIG. 6 is an exemplary diagram illustrating one embodiment of a method for creating a digitally magnified image for comparison to an optically zoomed image.

Referring to FIG. 6, the image center of frame 90 is located at the intersection of the crossing lines indicated by 92. The images for analysis are gathered for each magnification factor desired, for example, magnification from k=1 to N. The following steps are performed for each magnification factor. The camera is set to the magnification factor k and a frame is captured. Generally k is chosen as "1" but other values can be chosen. The process then obtains the center part 94 of frame 90. Center part 94 of frame 90 is digitally enlarged to double its size by interpolating both the horizontal and vertical directions (shown by arrows 95) to get frame 96.

Figure 7:
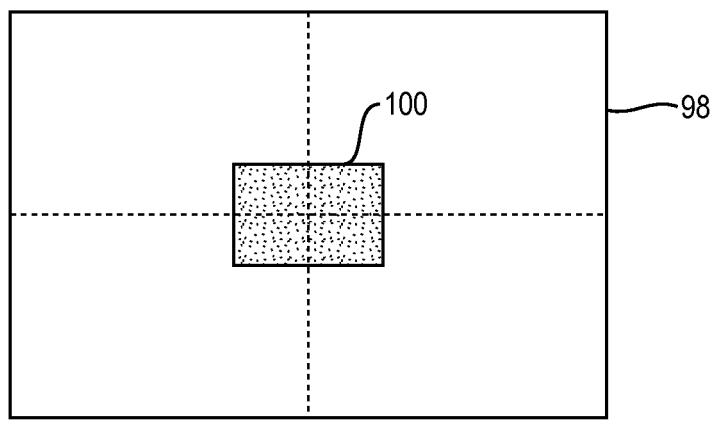
FIG. 7 is an exemplary diagram illustrating one embodiment of a method for selecting a block from an optically zoomed image for comparison to a digitally magnified image.

The camera is then set to a magnification of 2k, and a frame 98, shown in FIG. 7, is captured. The system then chooses a block 100 at the center of frame 98. At the start of the process, each of the components of the array of the accumulated distances is set to zero. The size of the array is W; it is the number of different blocks in the search window, that is, in the window size. For example, if the size of the block is u by v and the size of the window is U by V, then W=(U−u+1)(V−v+1).

The alignment analysis starts from the top-left corner and proceeds, for example, from the left side of the window to right side of the window, similarly from top to bottom, and moves one pixel at time.

Figure 8:
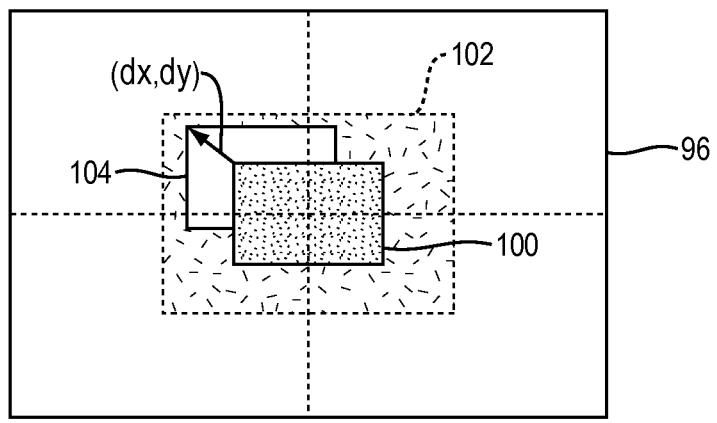
FIG. 8 is an exemplary diagram illustrating one embodiment of a method for comparing blocks in a search window.

The processor computes the block distance between block 100 and each of the blocks with the same size located in the search window 102 of frame 96, shown in FIG. 8. Each of the computed block distances is accumulated to a corresponding component of the accumulated distance array. Each component of the array corresponds to an accumulated block distance at one location.

The processor then searches through the array of accumulated block distances to find the minimal block distance. The corresponding coordinate of the minimal accumulated block distance is the coordinate of the optical axis center in the image plane. For example, block 104 in FIG. 8 illustrates the one with minimal block distance and has an offset vector of, for example, $(d_x, d_y)$, which indicates the number of pixels in the x and y directions that the optically magnified image is offset.

The processor compares the actual image at a given magnification point with an interpolated image at that same magnification point. The method continuously digitally zooms the image from zoom=1 to the desired zoom setting as the zoom setting is varied by the camera control system. At each point a central section of the optically zoomed image is compared to the central section of the digitally zoomed image. The images sections are compared and the location shift of the target is determined. The method then uses the offset calculations to shift the pixels captured by the sensor as it builds the output image signal, thus correcting the center shift.

Once the optical center is found, in the actual application, the camera is always centered to the optical center instead of image center. When the camera is zoomed in, the object will then always be at the center position.

Figure 9:
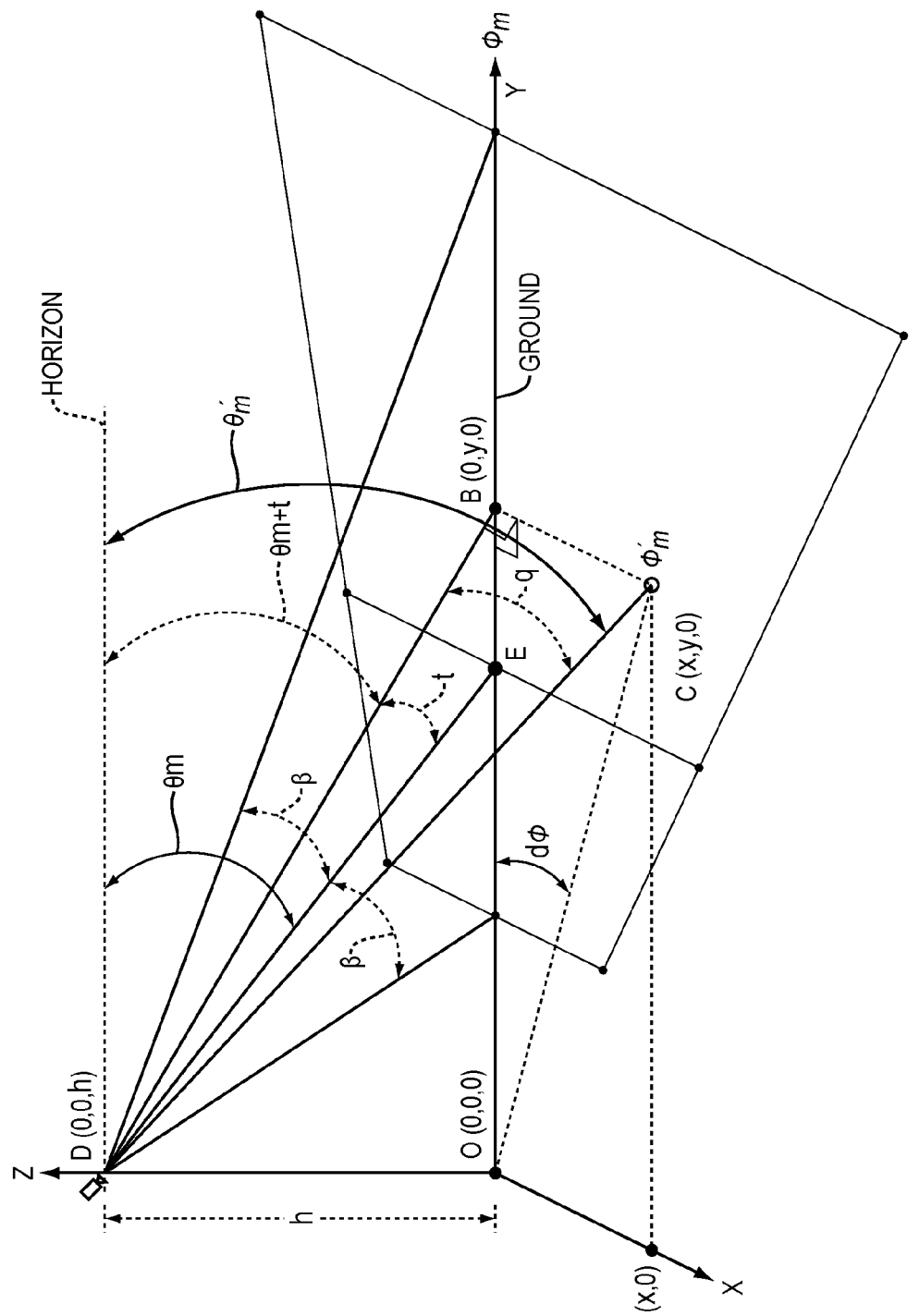
FIG. 9 is a diagram illustrating a geometric representation of coordinates for the camera and region.
Figure 10:
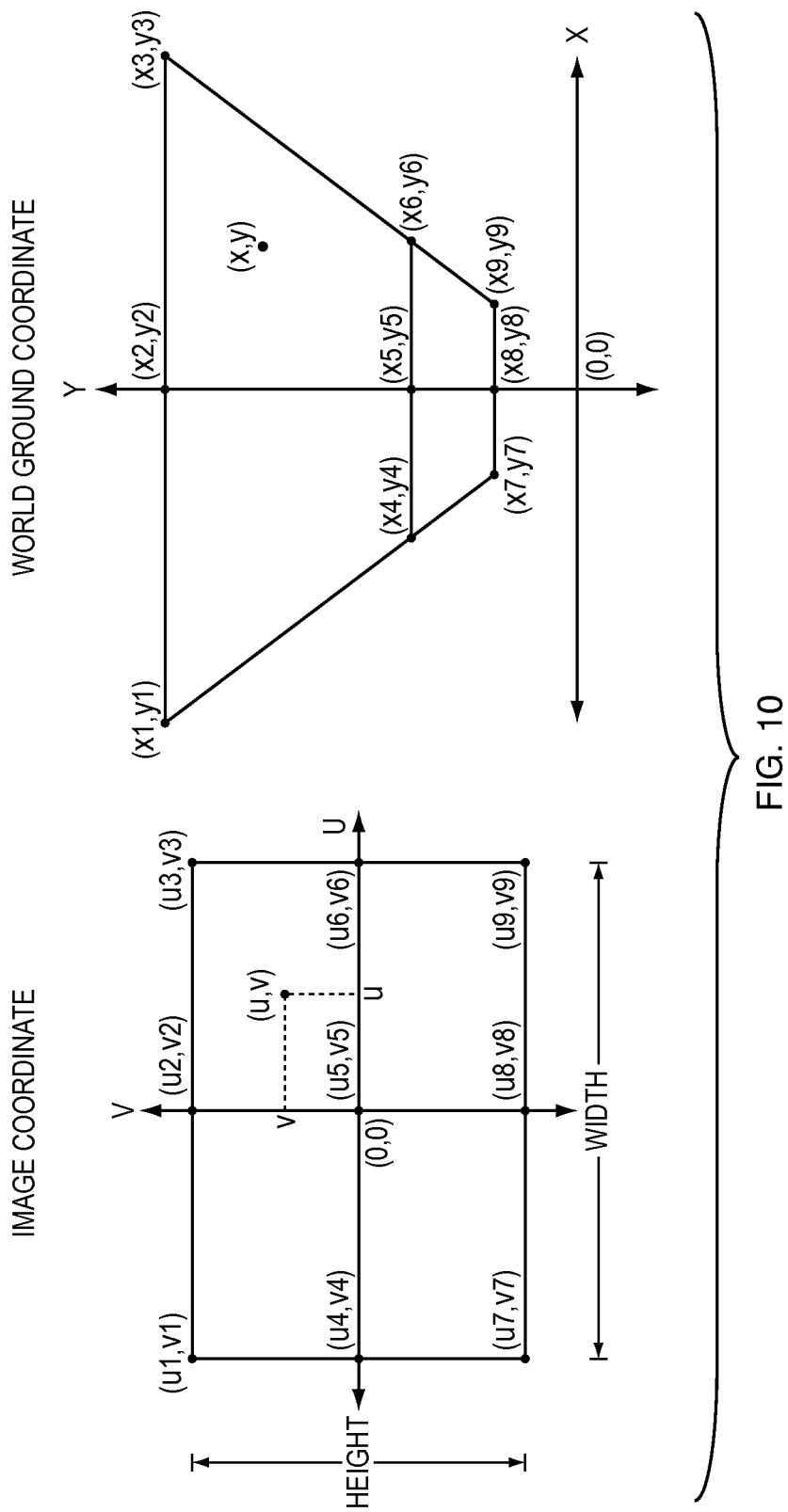
FIG. 10 is a diagram illustrating a geometric representation of points in an image coordinate and the corresponding points in a world ground coordinate.
Figure 11:
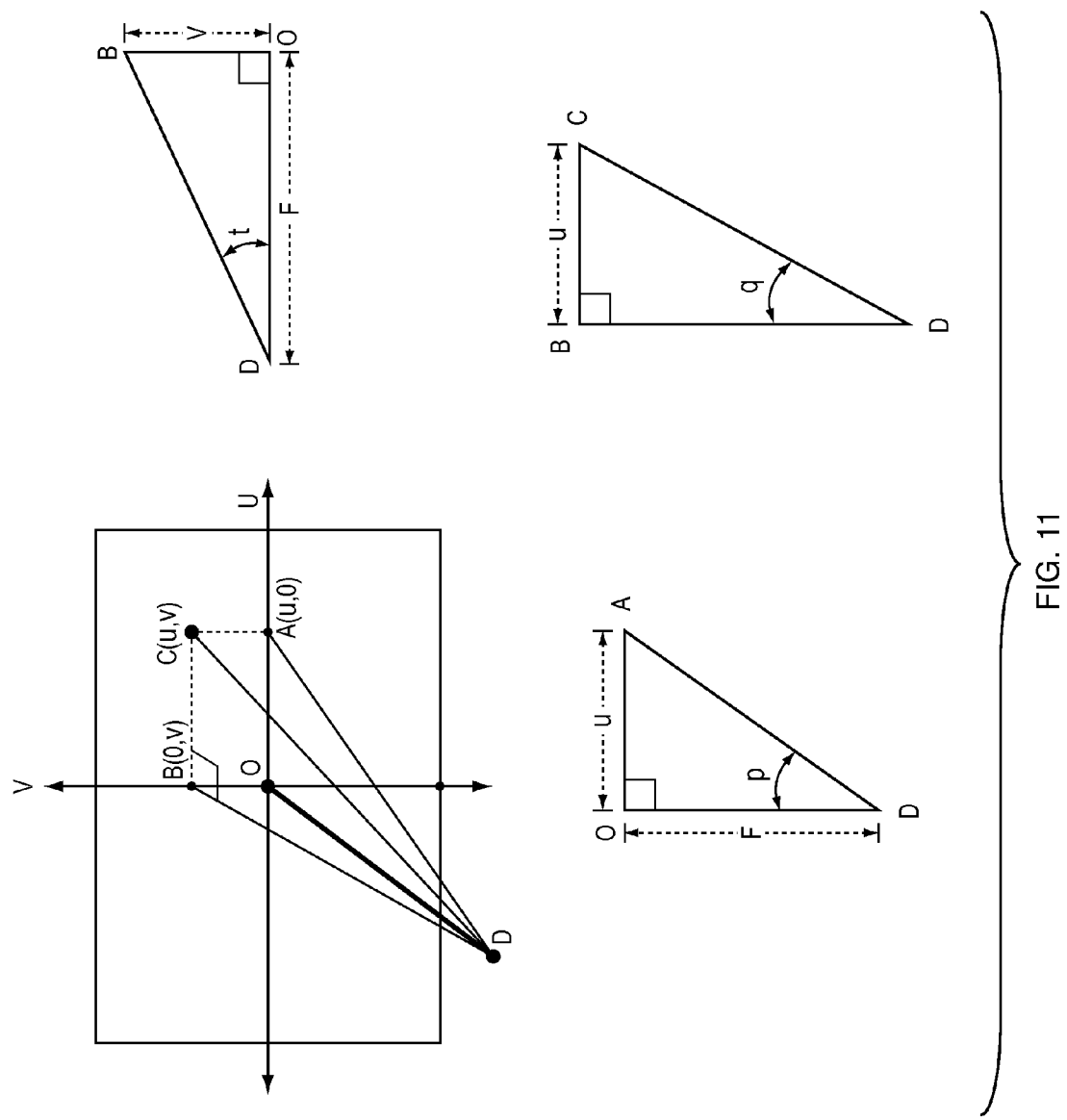
FIG. 11 is a diagram illustrating a geometric representation of a point in an image coordinate, the focal point of a camera and a focal length.

FIG. 9 illustrates a geometric representation of the world coordinates for the camera and the region the camera is facing. FIG. 10 shows geometric representation of the points $(u_i, v_i)$, for i=1 to 9, in the image coordinate and their corresponding points $(x_i, y_i)$ in the world ground coordinate; it also shows a point (u, v) in the image coordinate and its corresponding point (x, y) in the world ground coordinate. FIG. 11 illustrates a geometric representation of a point (u, v) in the image coordinate, the focal point of the camera, D, and the focal length, F.

Variables used in the equations below are defined as follows:

($\alpha$, $\beta$): half of the horizontal and vertical field of view, respectively,
$(I_w, I_h)$: image width and height (in pixels),
$A_p$: aspect ratio of pixel,
F: focal length (same unit as sensor size)
($\phi$, $\theta$): pan and tilt angle of camera, respectively,
h: height of the camera,
(u, v): unit in pixels,
(x, y): in feet or meters Assume that the camera is centered at $(\phi_m, \theta_m)$ position. An object is found and located at image coordinate (u, v) position. The goal is to move the camera to the new position, $(\phi'_m, \theta'_m)$, such that at this new position the object will become at the center of the image coordinate. FIG. 9 illustrates the pan and tilt angles, $(\phi'_m, \theta'_m)$, for the new position.

Given (u, v), $(\phi'_m, \theta'_m)$ is computed as follows:
1. Compute t, tan(t) and tan(q) as follows:

$$F = I_w / (2 \cdot \tan(\alpha))$$
$$\tan(t) = v \cdot A_p / F,$$
$$t = \tan^{-1}(v \cdot A_p / F)$$
$$\tan(q) = \frac{u}{\sqrt{F^2 + (v \cdot A_p)^2}}$$

2. If $(\theta_m + t) \leq 0°$, the formulae are as follows:

$$\theta'_m = \theta_m + t$$
$$\phi'_m = \phi_m + q,$$

$$q = \tan^{-1}\left(\frac{u}{\sqrt{F^2 + (v \cdot A_p)^2}}\right)$$

3. If $0° < (\theta_m + t) < 90'$, the formulae are as follows:

$$\theta'_m = \sin^{-1}[\sin(\theta_m + t) \cdot \cos(q)]$$
$$\phi'_m = \phi_m + \tan^{-1}\left(\frac{\tan(q)}{\cos(\theta_m + t)}\right)$$

4. If $(\theta_m + t) > 90°$, the formulae for pan angle, $\phi'_m$, are as follows:

$$t' = 180 - (\theta_m + t)$$

$$\phi' = \begin{cases} \phi_m - \tan^{-1}\left(\frac{\tan(q)}{\cos(t')}\right) + 180°, & \text{if } p > 0 \\ \phi_m - 180°, & \text{if } p = 0 \\ \phi_m - \tan^{-1}\left(\frac{\tan(q)}{\cos(t')}\right) - 180°, & \text{if } p < 0 \end{cases}$$

$$t' = 180 - (\theta + t)$$

$$\phi' = \begin{cases} \phi - \tan^{-1}\left(\frac{\tan(q)}{\cos(t')}\right) + 180°, & \text{if } p > 0 \\ \phi - 180°, & \text{if } p = 0 \\ \phi - \tan^{-1}\left(\frac{\tan(q)}{\cos(t')}\right) - 180°, & \text{if } p < 0 \end{cases}$$

Note: The above equations are based on the assumption that the image center and the optical center are the same point. If they are not aligned together, then the above equation needs some modifications. Let $(d_u, d_v)$ be the optical center and (0,0) be the image center in the image coordinate, respectively. The adjustment for the (u, v) are as follows:

$$u = u + d_u$$
$$v = v + d_v$$

That is $(u + d_u, v + d_v)$ will be used instead of (u,v) to compute $(\phi'_m, \theta'_m)$ in the above equations.

Figure 12:
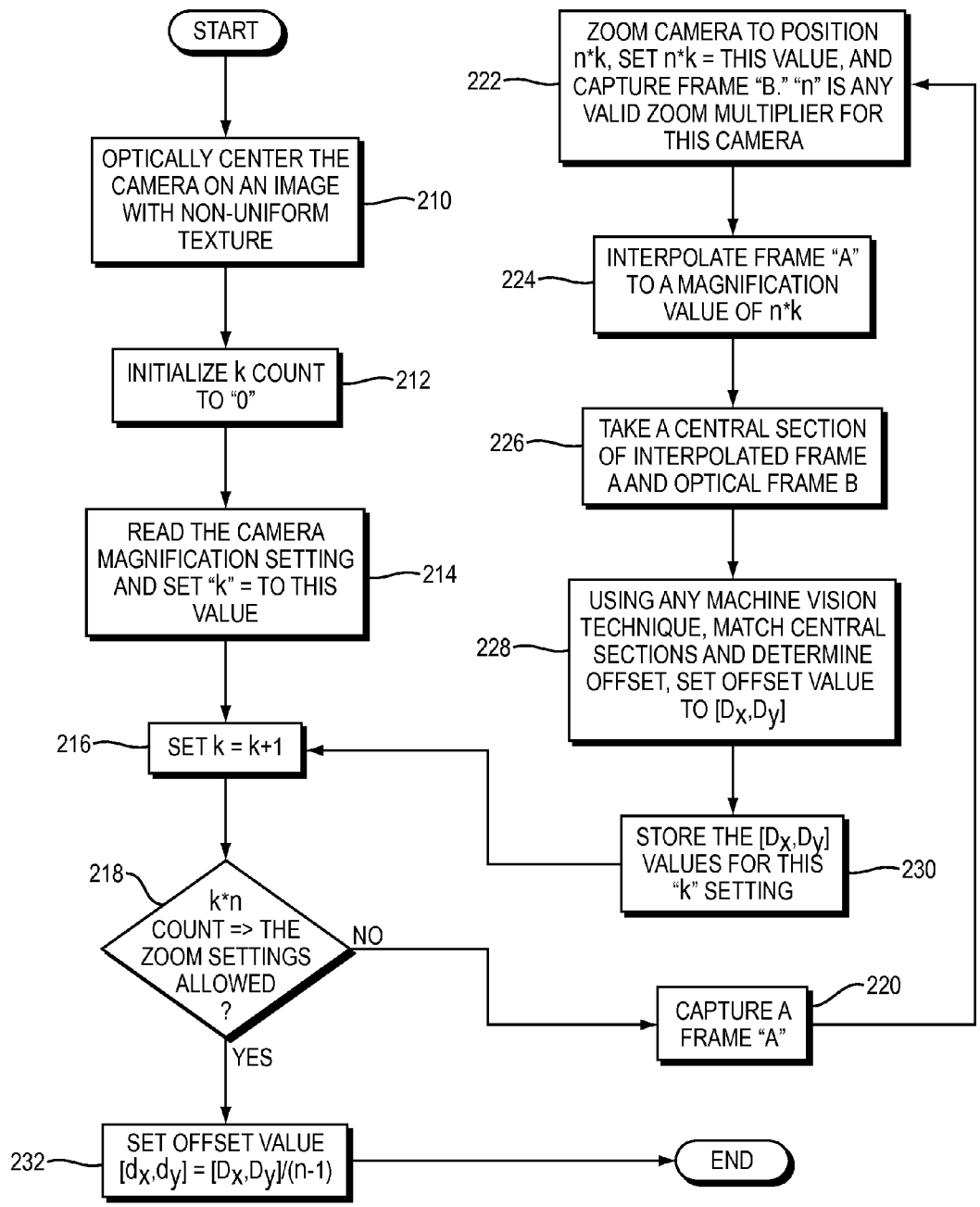
FIG. 12 is a flowchart illustrating an exemplary method of determining offset.

FIG. 12 illustrates an exemplary flowchart for implementing one embodiment of a method of determining the offset at different zoom settings. These offsets can be averaged for a single compensation factor to be used in resetting the image center or, for example, the offsets at various zoom settings can be stored and used in resetting the image center. For zoom factors in between the various measurements of offset, any suitable interpolation can be used to calculate the offset between the two closest measured offsets. This exemplary method of determining the offset at different zoom settings can be performed under the local control of the camera processor or other processor connected to the network, and the calculations can be performed locally in the camera processor or other processor connected to the network. Preferably the offsets are stored locally in the camera memory; however, they can be stored in other devices connected to the system such as, for example, a workstation.

At step 210, the camera is optically centered on an image with non-uniform texture. Then at step 212 the k count is initialized to zero. The camera magnification setting is read at step 214, and the k value is set to this value. The value for k is then set to k+1 at step 216. At decision point 218 the method determines if the k*n count is equal to or greater that the zoom settings allowed, where n is any valid zoom multiplier for the camera. If not, then the camera captures a frame A at step 220. In step 222 the camera is zoomed to position n*k, n*k is set equal to this value and a frame B is captured. Frame A is then interpolated to a magnification value of n*k in step 224. At step 226 a central section of interpolated frame A and optical frame B are taken and then in step 228 these central sections are matched and the offset is determined. The offset values are then stored for this k setting in step 230. The method then returns to step 216 where k is incremented. If decision block 218 determines that k*n is greater than the zoom settings allowed, then the method proceeds to block 232 where the offset value is determined by dividing the sum of the values of the various offsets by n−1.

Figure 13:
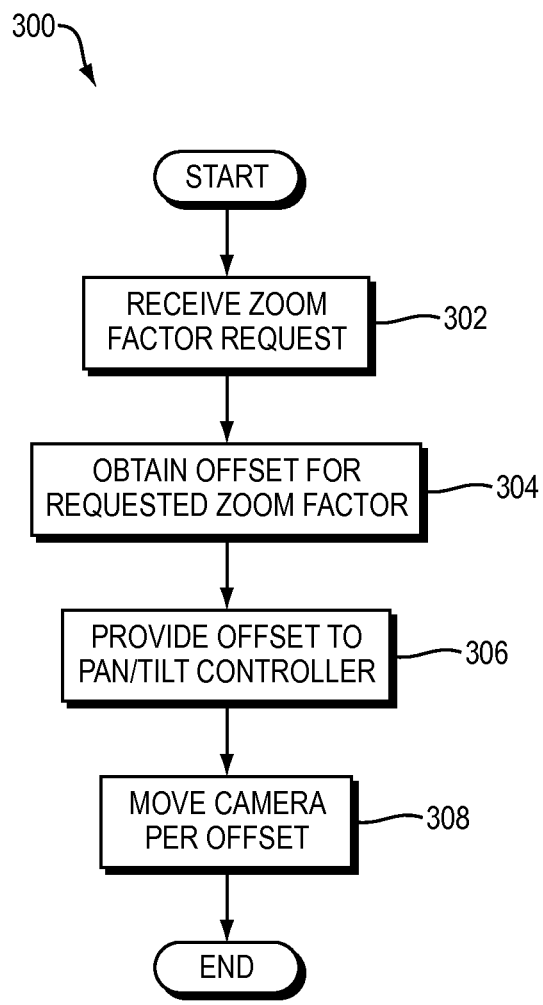
FIG. 13 is a flowchart illustrating an exemplary method of controlling a camera during a zooming function.

Referring to FIG. 13, a flowchart for an exemplary method 300 for centering an object during zooming is illustrated. This method can utilize the offset or offsets determined according to the methods described above. At step 302 a zoom factor request is received, for example, at zoom factor controller 28 in FIG. 1, from either an automatic controller or a manual input. At step 304, for example, processor 22 obtains the offset for the requested zoom factor from memory 25 and provides it to pan/tilt controller 19 at step 306 to adjust camera 10 so that object 14 remains centered. At step 308 pan/tilt controller 19 causes camera 10 to move slightly as required by the offset from processor 22 to keep object 14 centered.

Figure 14:
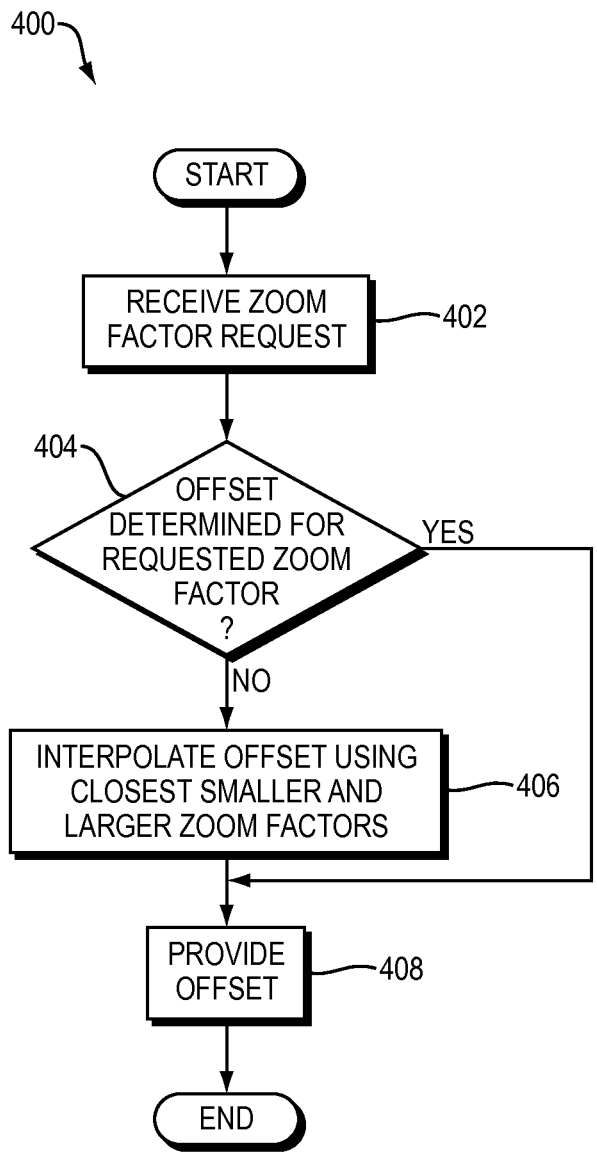
FIG. 14 is a flowchart illustrating an exemplary method of determining the offset during camera zooming.

FIG. 14 illustrates an exemplary method for determining the offset to be provided to pan/tilt controller 19 during zooming. Method 400 receives a zoom factor request at step 402. Processor 22 then at decision point 404 determines if an offset has been determined for the requested zoom factor. If, for example, during the offset determination process described above the required offset is the same as one of the zoom factors for which an offset was determined, then processor 22 simply provides that offset to pan/tilt controller 19 at step 408. Similarly, if, for example, a mean or average offset is applied based on the calculated offsets for various zoom factors, then processor 22 simply provides that offset to pan/tilt controller 19. If for example, offsets have been stored for various zoom factors, then processor 22 checks memory 25 for the appropriate offset. If the system does not have an offset in memory for the specific zoom factor requested, then at step 406 processor 22 interpolates the offset by, for example, using the closest smaller and larger zoom factor offsets, or other suitable methods, such as using the closest zoom factor offset or interpolating using the closes zoom factor.

In an environmentally stable location where the camera sensor does not change its characteristics, the calibration procedure can be performed once. The offset is stored in the camera's memory and then simply applied thereafter to every video frame. If the environment is subject to variables that change the camera's sensor characteristics, the procedure can be used periodically or continuously as required.

To verify the accuracy of the offset adjustment technique, different magnification factors from two times could be used. The results would be compared to the offset adjustment determined at a magnification factor of two. For example, a reason for this potential discrepancy is that the magnification factor at 2x may not be accurate, i.e., it may not really be two times. Also the method of determining the offsets at a plurality of different magnifications to provide an offset factor granularity that could be set as fine as a user determines appropriate for a particular camera, installation, or application.

The various methods described herein can be used in the field in real time at the installation site, as well as in a camera manufacturing process. The methods described above can be implemented in any camera that includes an electronic image sensor and an optically variable zoom capability. In an alternative embodiment a device that accepts video input and can provide a software platform to run the method to correct the output, provided that the hosting device can gather the camera zoom setting for the camera.

The processes and methods described and shown herein can be stored on a non-transitory computer readable medium, which refers to any non-transitory storage device used for storing data accessible by a computer, for example, a magnetic hard disk, a floppy disk, an optical disk, such as a CD-ROM or a DVD, a magnetic tape, and a memory chip.

What is claimed is:

1. A method of centering an object in the field of view of a camera during zooming, the method comprising:
   setting a camera zoom to a first magnification factor to configure the camera to have a first field of view;
   positioning the camera to have an object in a first position in the first field of view;
   capturing a first image with the camera at the first magnification factor;
   setting the camera zoom to a second magnification factor to configure the camera to have a second field of view with the second magnification factor being greater than the first magnification factor;
   capturing a second image with the camera at the second magnification factor;
   digitally altering a portion of the first image to create a third image with a magnification factor equivalent to the second magnification factor;
   comparing the third image with the second image to determine an offset of the object from the first position of the object to the position of the object in the third image; and
   adjusting the camera to be centered to an optical center of the camera during zooming based on the determined offset.

2. A method as recited in claim 1 wherein positioning the camera to have an object in a first position in the first field of view comprises positioning the camera to center the object in the first field of view.

3. A method as recited in claim 1 further comprising:
   capturing a fourth image with the camera at a third magnification factor;
   digitally altering a portion of the first image to create a fifth image with a magnification factor equivalent to the third magnification factor,
   comparing the fifth image with the fourth image to determine an offset of the object from the first position of the object to the position of the object in the fourth image; and
   adjusting the camera to be centered to an optical center of the camera during zooming based on the determined offsets.

4. A method as recited in claim 3 wherein adjusting the camera comprises interpolating the offset based on the magnification factor and the determined offsets.

5. A method as recited in claim 1 wherein comparing the third image with the second image comprises choosing a block from the third image containing at least a portion of the object and comparing it to blocks from the second image to determine a block with a minimal block distance.

6. A method as recited in claim 1 wherein adjusting the camera comprises adjusting the position of the camera.

7. A method as recited in claim 1 wherein adjusting the camera comprises adjusting the position of the image sensor of the camera.

8. A system for centering an object in the field of view of a camera comprising:
   a camera having a lens with a variable zoom; a lens controller connected to the lens to vary the zoom of the lens; an image sensor, the lens being positioned to provide light rays to the image sensor; an input for receiving an instruction to change the zoom of the lens; a position controller for moving the camera; and
   a processor in communication with the camera to provide signals to the camera and to receive images captured by the camera, the processor being adapted to:
      provide a signal to the lens controller to set the lens zoom to a first magnification factor to configure the lens to have a first field of view;
      provide a signal to the position controller to position the camera to have an object in a first position in the first field of view;
      provide a signal to the camera to capture a first image with the camera at the first magnification factor;
      provide a signal to set the camera zoom to a second magnification factor to configure the camera to have a second field of view with the second magnification factor being greater than the first magnification factor;
      provide a signal to the camera to capture a second image with the camera at the second magnification factor;
      receive the first image from the camera;
      digitally alter a portion of the first image to create a third image with a magnification factor equivalent to the second magnification factor;
      receive the second image;
      compare the third image with the second image to determine an offset of the object from the first position of the object to the position of the object in the third image; and
      provide a signal to the position controller to adjust the camera to be centered to an optical center of the camera during zooming based on the offset.

9. A system as recited in claim 8 wherein the processor is adapted to generate a signal to the position controller to position the camera to center the object in the first field of view.

10. A system as recited in claim 8 wherein the processor is adapted to:
   generate a signal to the camera to capture a fourth image at a third magnification factor;
   digitally alter a portion of the first image to create a fifth image with a magnification factor equivalent to the third magnification factor;
   receive the fourth image;
   compare the fifth image with the fourth image to determine an offset of the object from the first position of the object to the position of the object in the fourth image; and
   provide a signal to the position controller to adjust the camera to be centered to an optical center of the camera during zooming based on the determined offsets.

11. A system as recited in claim 10 wherein the processor is adapted to provide a signal to the position controller to adjust the camera position based on interpolating the offset based on the magnification factor and the determined offsets.

12. A non-transitory computer readable medium comprising instructions configured to cause a processor to:
   set a camera zoom to a first magnification factor to configure the camera to have a first field of view;
   position the camera to have an object in a first position in the first field of view;
   capture a first image with the camera at the first magnification factor;
   set the camera zoom to a second magnification factor to configure the camera to have a second field of view with the second magnification factor being greater than the first magnification factor;
   capture a second image with the camera at the second magnification factor;
   digitally alter a portion of the first image to create a third image with a magnification factor equivalent to the second magnification factor;
   compare the third image with the second image to determine an offset of the object from the first position of the object to the position of the object in the third image; and
   adjust the camera to be centered to an optical center of the camera during zooming based on the determined offset.

13. A non-transitory computer readable medium as recited in claim 12 wherein positioning the camera to have an object in a first position in the first field of view comprises causing the processor to position the camera to center the object in the first field of view.

14. A non-transitory computer readable medium as recited in claim 12 further comprising instructions configured to cause the processor to:
   capture a fourth image with the camera at a third magnification factor;
   digitally alter a portion of the first image to create a fifth image with a magnification factor equivalent to the third magnification factor;
   compare the fifth image with the fourth image to determine an offset of the object from the first position of the object to the position of the object in the fourth image; and
   adjust the camera to be centered to an optical center of the camera during zooming based on the determined offsets.

15. A non-transitory computer readable medium as recited in claim 12 wherein adjusting the camera comprises causing the processor to interpolate the offset based on the magnification factor and the determined offsets.

16. A non-transitory computer readable medium as recited in claim 12 wherein comparing the third image with the second image comprises causing the processor to choose a block from the third image containing at least a portion of the object and compare it to blocks from the second image to determine a block that has a minimal block distance.

17. A non-transitory computer readable medium as recited in claim 12 wherein adjusting the camera comprises causing the processor to adjust the position of the camera.

18. The method as recited in claim 1 wherein:
   the digitally altered portion of the first image is a central portion; and
   comparing the third image with the second image to determine the offset comprises comparing a central portion of the third image with a central portion of the second image.

19. The system as recited in claim 8 wherein the processor is further adapted to:
   digitally alter a central portion of the first image to create the third image; and
   compare a central portion of the third image with a central portion of the second image to determine the offset of the object from the first position of the object to the position of the object in the third image.

20. A non-transitory computer readable medium as recited in claim 12 wherein:

the digitally altered portion of the first image is a central portion; and comparing the third image with the second image to determine the offset comprises comparing a central portion of the third image with a central portion of the second image.

* * * * *